(12) United States Patent
Zhang et al.

(10) Patent No.: US 11,733,263 B2
(45) Date of Patent: Aug. 22, 2023

(54) 3-AXIS ACCELEROMETER

(71) Applicant: Analog Devices, Inc., Wilmington, MA (US)

(72) Inventors: Jianglong Zhang, Wilmington, MA (US); Xin Zhang, Wilmington, MA (US)

(73) Assignee: Analog Devices, Inc., Wilmington, MA (US)

( * ) Notice: Subject to any disclaimer, the term of this patent is extended or adjusted under 35 U.S.C. 154(b) by 86 days.

(21) Appl. No.: 16/138,091

(22) Filed: Sep. 21, 2018

(65) Prior Publication Data
US 2020/0096538 A1    Mar. 26, 2020

(51) Int. Cl.
| | | |
|---|---|---|
| *G01P 15/125* | (2006.01) | |
| *G01P 15/08* | (2006.01) | |
| *G01P 15/18* | (2013.01) | |

(52) U.S. Cl.
CPC ........ *G01P 15/125* (2013.01); *G01P 15/0802* (2013.01); *G01P 15/18* (2013.01); *G01P 2015/084* (2013.01); *G01P 2015/0862* (2013.01)

(58) Field of Classification Search
CPC ..... G01P 15/125; G01P 15/18; G01P 15/0802
See application file for complete search history.

(56) References Cited

U.S. PATENT DOCUMENTS

| | | |
|---|---|---|
| 6,845,670 B1 | 1/2005 | McNeil et al. |
| 7,121,141 B2 | 10/2006 | McNeil |
| 7,258,011 B2 | 8/2007 | Nasiri et al. |
| 7,757,555 B2 | 7/2010 | Pan et al. |
| 8,539,836 B2 | 9/2013 | McNeil |
| 8,637,943 B1 | 1/2014 | Yang |

(Continued)

FOREIGN PATENT DOCUMENTS

| | | |
|---|---|---|
| CN | 102798734 A | 11/2012 |
| CN | 104714050 A | 6/2015 |

(Continued)

OTHER PUBLICATIONS

International Search Report and Written Opinion dated Dec. 31, 2019 in connection with International Application No. PCT/US2019/051623.

(Continued)

*Primary Examiner* — Helen C Kwok
(74) *Attorney, Agent, or Firm* — Wolf, Greenfield & Sacks, P.C.

(57) ABSTRACT

A three-axis accelerometer includes a single, integrated mass including at least one lateral (x-y) proof mass and at least one vertical (z) proof mass. The vertical proof mass is arranged as a teeter-totter mass, which is located within the lateral proof mass. The vertical proof mass is mechanically coupled to the lateral proof mass with one or more torsional springs, and the lateral proof mass is mechanically coupled to one or more anchors with one or more lateral springs. The at least one vertical proof mass may be symmetrically positioned about one or more axes of the three-axis accelerometer, so that the 3-axis accelerometer has in-plane symmetry. The three-axis accelerometer may be less susceptible for mechanical cross-talk or noise and may provide a smaller packaged solution for sensing acceleration in three directions.

11 Claims, 6 Drawing Sheets

(56) References Cited

U.S. PATENT DOCUMENTS

| | | | |
|---|---|---|---|
| 8,739,626 B2 | 6/2014 | Acar | |
| 8,978,475 B2 | 3/2015 | Acar | |
| 9,062,972 B2 | 6/2015 | Acar et al. | |
| 9,213,045 B2 | 12/2015 | Jia et al. | |
| 9,246,017 B2 | 1/2016 | van der Heide et al. | |
| 9,360,496 B2 | 6/2016 | Naumann | |
| 9,455,354 B2 | 9/2016 | Acar | |
| 9,506,756 B2 | 11/2016 | McNeil et al. | |
| 9,606,756 B2 | 3/2017 | Oka | |
| 10,473,686 B2* | 11/2019 | Zhang | G01P 15/18 |
| 10,545,167 B2 | 1/2020 | Zhang et al. | |
| 2005/0109108 A1* | 5/2005 | Chen | G01P 15/18 73/514.16 |
| 2005/0160814 A1 | 7/2005 | Vaganov et al. | |
| 2008/0110260 A1* | 5/2008 | Konno | G01P 15/125 73/514.32 |
| 2010/0024552 A1 | 2/2010 | Foster | |
| 2010/0024554 A1* | 2/2010 | Classen | G01P 15/125 73/514.32 |
| 2010/0107763 A1* | 5/2010 | Lin | G01P 15/18 73/514.32 |
| 2010/0122579 A1* | 5/2010 | Hsu | G01P 15/18 73/514.32 |
| 2011/0023606 A1* | 2/2011 | Burghardt | G01P 15/125 73/514.32 |
| 2011/0154899 A1* | 6/2011 | Classen | G01P 15/125 73/514.32 |
| 2012/0000287 A1* | 1/2012 | Frangi | G01P 15/125 73/514.32 |
| 2013/0214367 A1 | 8/2013 | van der Heide et al. | |
| 2014/0144235 A1* | 5/2014 | Suzuki | B81B 3/0051 73/514.32 |
| 2014/0216156 A1* | 8/2014 | Sakai | G01P 15/125 73/514.32 |
| 2014/0311242 A1 | 10/2014 | Lee et al. | |
| 2015/0268269 A1* | 9/2015 | Jia | G01P 15/18 73/514.32 |
| 2016/0084872 A1* | 3/2016 | Naumann | G01P 15/125 73/514.32 |
| 2016/0274141 A1* | 9/2016 | Enjalbert | G01P 15/125 |
| 2016/0370403 A1 | 12/2016 | Merdassi et al. | |
| 2017/0023608 A1* | 1/2017 | Tang | G01P 15/125 |
| 2017/0108529 A1* | 4/2017 | Zhang | G01P 15/18 |
| 2017/0328931 A1 | 11/2017 | Zhang et al. | |
| 2018/0031602 A1* | 2/2018 | Huang | G01P 15/125 |
| 2018/0275161 A1* | 9/2018 | Tang | G01P 15/18 |
| 2019/0187169 A1* | 6/2019 | Tang | G01P 15/18 |

FOREIGN PATENT DOCUMENTS

| | | |
|---|---|---|
| CN | 103941041 B | 8/2016 |
| DE | 10 2008 017 156 A1 | 10/2009 |
| EP | 0 675 375 A2 | 10/1995 |
| EP | 3 121 605 B1 | 5/2018 |
| WO | WO 2004/077073 A1 | 9/2004 |
| WO | WO 2016/108770 A1 | 7/2016 |

OTHER PUBLICATIONS

Hollocher et al., A Very Low Cost, 3-axis, MEMS Accelerometer for Consumer Applications. IEEE Sensors 2009 Conference. Oct. 25-28, 2009;953-7.

Lemkin et al., A 3-Axis Force Balanced Accelerometer Using a Single Proof-Mass. Transducers '97. 1997 International Conference on Solid-State Sensors and Actuators. Chicago, Jun. 16-19, 1997:1185-88.

Sun et al., Implementation of a Monolithic Single Proof-Mass Tri-Axis Accelerometer Using CMOS-MEMS Technique. IEEE Transactions on Electron Devices. Jul. 2010;57(7):1670-1679.

Tsai et al., A 400×400μm2 3-Axis CMOS-MEMS Accelerometer with Vertically Integrated Fully-Differential Sensing Electrodes. Transducers' 11. Beijing, China. Jun. 5-9, 2011;811-14.

Tsuchiya et al., Design and Fabrication of a Differential Capacitive Three-Axis SOI Accelerometer Using Vertical Comb Electrodes. Transactions on Electrical and Electronic Engineering. 2009;4:345-51.

Xu et al., Design and Fabrication of a Slanted-Beam MEMS Accelerometer. Micromachines 2017;8(77):12 pages.

Yuan et al., Micromachined tri-axis capacitive accelerometer based on the single mass. Key Engineering Materials. 2015; 645-646:630-5.

International Preliminary Report on Patentability dated Apr. 1, 2021 in connection with International Application No. PCT/US2019/051623.

\* cited by examiner

3-AXIS ACCELEROMETER

FIELD OF THE DISCLOSURE

The present application relates to microelectromechanical systems (MEMS) inertial sensors.

BACKGROUND

Some microelectromechanical systems (MEMS) inertial sensors are used to measure acceleration in one or more directions, and are referred to as accelerometers. These accelerometers generally utilize proof masses springedly coupled to a substrate, which are displaced in response to experiencing acceleration. Because of the spring couplings, the proof mass(es) often oscillate in response to the acceleration. The displacement and/or oscillation frequency of the proof mass(es) is measured using capacitive sensing techniques, which result in an analog output signal representative of the displacement or oscillation. Some accelerometers, referred to as resonant accelerometers, use drivers to oscillate the proof mass(es) at a predetermined frequency. In response to acceleration, the oscillation frequency of the proof mass(es) changes. The frequency deviation from the predetermined drive frequency may be measured to determine the applied acceleration.

Some conventional three-axis accelerometers utilize individual proof masses for each sensing direction. That is, for a three-axis accelerometer, three separate and mechanically independent proof masses are employed, with one proof mass assigned to each direction. Typically, lateral proof masses (e.g., x and/or y-axis proof masses) are displaced and/or oscillate in a single plane. Vertical proof masses (e.g., z-axis proof masses) generally are displaced and/or oscillate into or out of the single plane.

SUMMARY OF THE DISCLOSURE

A three-axis accelerometer includes a single, integrated mass including at least one laterally-moving (x-y) mass integrated with at least one vertically-moving (z) mass. The vertically-moving mass is arranged as a teeter-totter mass, which is located within the laterally-moving mass. The vertically-moving mass is mechanically coupled to the laterally-moving mass with one or more torsional springs, and the laterally-moving mass is mechanically coupled to one or more anchors or supports with one or more laterally-moving springs. The at least one vertically-moving mass may be symmetrically positioned about one or more axes of the three-axis accelerometer, so that the three-axis accelerometer has in-plane symmetry. The three-axis accelerometer may provide various benefits, examples of which include being less susceptible to mechanical cross-talk or noise than alternative three-axis accelerometer constructions, and having a smaller footprint—occupying less chip area—than alternative three-axis accelerometer constructions.

In some embodiments, a single mass integrated three-axis accelerometer includes an x-y acceleration detection portion of the single mass and a teeter-totter z-axis acceleration detection portion of the single mass embedded within the x-y acceleration detection portion.

In some embodiments, an integrated three-axis accelerometer includes an anchor coupled to a substrate, a combined x-y acceleration detection proof mass, and first and second teeter-totter z-axis acceleration detection proof masses embedded within the x-y acceleration detection proof mass. The combined x-y acceleration detection proof mass is coupled to the anchor by a first tether and the first and second teeter-totter z-axis acceleration detection proof masses are coupled to the x-y acceleration detection proof mass by a second tether and third tether, respectively.

In some embodiments, a single mass integrated three-axis accelerometer includes an x-y acceleration detection portion of the single mass and at least one teeter-totter z-axis acceleration detection portion of the single mass embedded within the x-y acceleration detection portion. The accelerometer is symmetrical about both an x-axis and a y-axis of the accelerometer.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

The inventors have appreciated that conventional three-axis accelerometers with multiple, independent proof masses for each sensing axis are too large and/or expensive for many applications. Such three-axis accelerometers occupy significant space (chip real estate) as each proof mass needs distinct sensing circuitry as well as anchors and springs. Some three-axis accelerometers address this problem by utilizing only a single solid proof mass for sensing acceleration in all three directions. However, the inventors have appreciated that such a construction is highly susceptible to mechanical stress and/or mechanical cross-talk as the single solid proof mass is sometimes excited in any of the three sensing directions irrespective of the direction of the applied acceleration. This mechanical stress and/or mechanical cross-talk is undesirable, as it translates to poorer performance of the accelerometer.

To address this problem, some three-axis accelerometers utilize integrated proof masses with an x-y axis mass circumscribed by a separate z-axis proof mass. However, the inventors have appreciated that these accelerometers suffer from drawbacks including low accuracy and high z-axis offset error. A single outer-mass z-axis proof mass is non-symmetrical with respect to its pivot axis, which can give rise to modal crosstalk in the three-axis accelerometer.

Moreover, the inventors have appreciated that such a configuration leads to greater signal offset errors for the z-axis proof mass because it is by necessity positioned further from its pivot axis than it could be if the x-y axis mass was not disposed inside it.

In view of the above, aspects of the present application provide an integrated three-axis accelerometer including an x-y axis proof mass with an embedded proof mass for detection of z-axis acceleration. Such an arrangement may be implemented in a smaller footprint than alternative designs and may have improved accuracy relative to conventional single-mass accelerometers due to reduced mechanical crosstalk and z-axis offset error.

According to an aspect of the present application, a single mass integrated three-axis accelerometer is provided. The accelerometer includes an x-y axis proof mass configured to move in-plane in lateral directions (e.g., x and y-directions). The x-y axis proof mass includes an embedded mass configured to pivot out of plane in a vertical direction (e.g., z-direction). In some embodiments, the embedded mass is a teeter-totter mass configured to rotate in and out of the x-y plane. As the embedded z-axis proof mass is incorporated into the x-y axis proof mass, it also contributes to x-y motion. Thus, the accelerometer may be said to be a single mass three-axis accelerometer.

According to another aspect of the present application, a single mass integrated three-axis accelerometer includes a proof mass configured to move in-plane in x and y-directions, with two or more embedded masses configured to move out of plane in the z-direction. The accelerometer may be symmetrical about one or more axes, such as being symmetrical about the x and y axes (referred to herein as "in-plane symmetry"). The symmetrical construction may reduce the occurrence of mechanical cross-talk between the x, y, and z-axis modes of operation and offer better offset performance.

According to yet another aspect of the present application, a single mass integrated three-axis accelerometer includes a single proof mass with an x-y acceleration detection portion and a z-acceleration detection portion embedded within the x-y acceleration detection portion. The accelerometer may be symmetrical about both an x-axis and a y-axis of the accelerometer, thus exhibiting in-plane symmetry.

As used herein, an "x-y axis proof mass" is one which is configured to move in the x-y plane. A "z-axis proof mass" is one which is configured to move in the z-direction, for example by rotation about the x-y plane.

Figure 1:
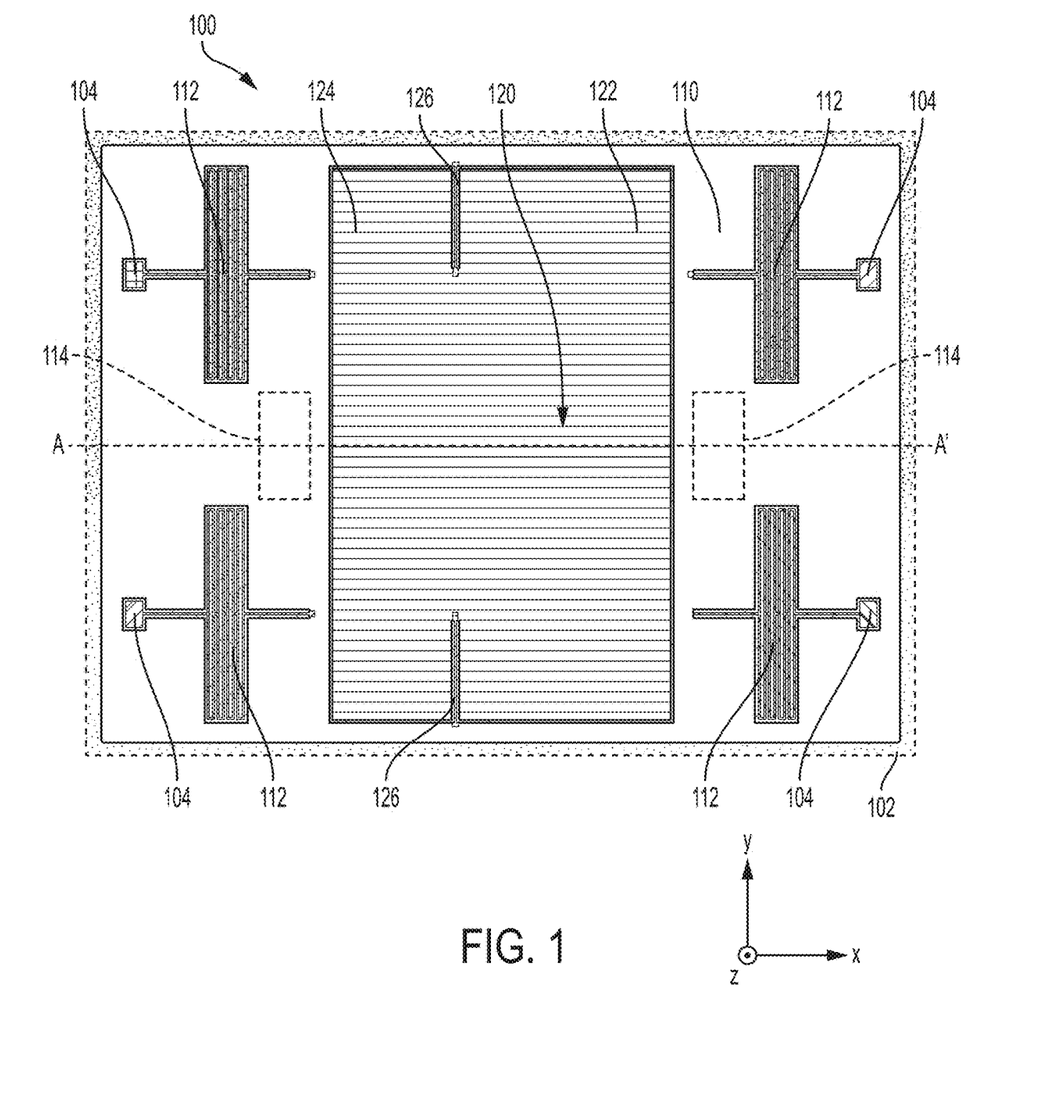
FIG. 1 is a top view of one embodiment of a three-axis accelerometer having a z-axis proof mass embedded within an x-y axis proof mass.

FIG. 1 depicts one embodiment of a three-axis accelerometer according to a non-limiting embodiment of the present application. In this non-limiting embodiment, the three-axis accelerometer 100 includes an x-y axis proof mass with an embedded z-axis proof mass. The x-y axis proof mass is coupled to a fixed support, such as a substrate, and the embedded z-axis proof mass is coupled to the x-y axis proof mass. Referring to the figure, the three-axis accelerometer 100 includes an x-y axis proof mass 110 and an embedded z-axis proof mass 120 including a first portion 122 and a second portion 124 (which are sometimes referred to as positive and negative portions, respectively). The three-axis accelerometer 100 also includes a substrate 102, anchors 104, x-y tethers 112, and z-tethers 126.

The substrate 102 functions as a base for the accelerometer. That is, substrate 102 may support the proof mass, and the proof mass may move relative to the substrate 102. The substrate 102 may be formed of any suitable material, such as a semiconductor material (e.g., silicon). The substrate may include driving and/or sensing circuitry, such as electrodes, driver circuits, filter circuits, or any other circuitry for operation of the three-axis accelerometer. In some embodiments, the anchors 104 represent extensions of the substrate 102, such as being vertical pillars of the substrate. However, alternatives are possible. For example, the anchors 104 may be formed of a separate material in some embodiments. The anchors themselves may connect to the x-y tethers 112 to suspend the x-y axis proof mass (and indirectly the z-axis proof mass) above the substrate 102.

The x-y axis proof mass 110 is configured to detect acceleration in the x and y-directions. Specifically, the x-y axis proof mass 110 is arranged to move in lateral directions (x and y-directions) in response to acceleration in those directions. The resulting movement of the x-y axis proof mass 110 may be measured and used to calculate acceleration in at least one of the x and y-directions. The x-y tethers 112 are arranged to couple the x-y axis proof mass 110 to the anchors 104 and allow motion of the x-y axis proof mass 110 in the x and y-directions. Additionally, the x-y tethers 112 are stiff in the z-direction to reduce or eliminate mechanical cross-talk of the x-y axis proof mass 110. The x-y tethers 112 provide a restoring force to the x-y axis proof mass 110. In this non-limiting example, the x-y tethers 112 are arranged as a box spring which compresses in a first direction (e.g., the x-direction) and rotates in a second in-plane direction (e.g., the y-direction). However, other configurations of the tethers 112 are possible.

The x-y axis proof mass 110 may have various suitable shapes and dimensions, and may be formed of any suitable material. In the non-limiting example illustrated, the x-y axis proof mass 110 is substantially rectangular, having a substantially rectangular outer periphery. The dimension of the x-y axis proof mass may be any suitable dimensions. For example, the sides of the outer periphery of the x-y axis proof mass may be between 50-500 microns each (including any values with that range), or any other suitable values. The x-y axis proof mass may be formed of any suitable material, such as silicon. In some embodiments, the x-y axis proof mass 110 is formed by etching it from the substrate 102, although alternative fabrication processes are possible. In some embodiments, the x-y tethers 112 are formed of the same material. For example, the x-y axis proof mass 110 and x-y tethers 112 may be etched from a common silicon layer of the substrate 102.

The x-y axis proof mass 110 may include drive/sense electrodes in some embodiments. For example, the motion of the x-y axis proof mass 110 may be detected using comb fingers, which may be positioned at any suitable location of the x-y axis proof mass. For example, the fingers may be positioned in the regions delimited by boxes 114 and may have any suitable configuration. The substrate 102 may include corresponding drive/sense electrodes. The electrodes may allow for capacitive sensing of the motion of the x-y axis proof mass 110. When multiple comb drives are employed, differential sensing may be used, which may provide improved accuracy and precision of the accelerometer. Separate comb drives may be used for each of the x and y axes. In some embodiments, the drive electrodes may be used to oscillate the x-y axis proof mass and the z-axis proof mass at a predetermined frequency about the resting position.

The z-axis proof mass 120 is arranged as a teeter-totter mass with a first portion 122 and a second portion 124, representing the portions of the z-axis proof mass 120 on separate sides of the pivot axis of z-tether 126. Accordingly, the z-axis proof mass is arranged to rotate into or out of the x-y plane. The first portion 122 has a larger mass than the second portion 124. This mass imbalance causes the z-axis proof mass 120 to rotate in response to an applied z-direction acceleration. The z-tethers 126 are arranged as torsional springs which resist the rotation of the x-y axis proof mass and restore the z-axis proof mass to a resting position. The z-tethers 126 couple the z-axis proof mass to the x-y axis proof mass. Because the z-axis proof mass 120 is coupled only to the x-y axis proof mass 110, and not directly to the substrate 102, the z-axis proof mass 120 moves in the x-y plane with the x-y axis proof mass 110, and thus may be considered part of the x-y axis proof mass 110. The z-axis proof mass 120 is embedded within the x-y axis proof mass 110 because it moves with the x-y axis proof mass 110. As the z-axis proof mass is embedded within the x-y axis proof mass, the z-axis proof mass contributes to the x-y sensing directions. However, the z-axis proof mass is decoupled from the x-y axis proof mass in the z-direction by the z-tethers so that the x-y axis proof mass does not contribute to the z-direction sensing. Because the z-axis proof mass is embedded within the x-y axis proof mass, they may be considered to form a single proof mass, with the x-y axis proof mass representing one portion of the single proof mass and the z-axis proof mass representing a second portion of the proof mass. Thus, it should be appreciated that at least some of the aspects of the present application may be considered to provide a single, integrated proof mass for sensing acceleration in three directions, and that the single, integrated proof mass may include an x-y acceleration detection portion and a z-acceleration detection portion.

The z-axis proof mass 120 may include electrodes allowing for sensing/driving of its motion. For example, the first and second portions 122 and 124 may be doped to be conductive, or may include conductive layers (e.g., metal layers), and may form a capacitance with structures (e.g., electrodes) on the substrate 102 underlying the z-axis proof mass. The capacitances may allow for capacitive sensing and/or driving of the z-axis proof mass.

As shown in FIG. 1, the three-axis accelerometer 100 is symmetrical about the x-axis. That is, on either side of a longitudinal centerline A-A' parallel with the x-axis the accelerometer has an equal distribution of mass including both x-y axis proof mass 110 and the z-axis proof mass 120. According to the embodiment of FIG. 1, the accelerometer 100 is not symmetrical about the y-axis. As the z-axis proof mass is a teeter-totter mass, the z-axis proof mass has an unequal weight distribution about the y-axis. Accordingly, the accelerometer has partial in-plane symmetry—symmetry about one of the x and y-axes—but not total in-plane symmetry (symmetry about both the x and y-axes). In some embodiments, the substrate, anchors, and drive and/or sense electrodes may have partial or total in-plane symmetry or any other suitable arrangement, as the present disclosure is not so limited.

Variations on the tethers 112 are possible, including the number, positioning, orientation, shape, and material. In some embodiments, the x-y tethers 112 may be arranged as separate x-tethers and y-tethers. That is, the accelerometer 100 may include x-tethers arranged to allow displacement of the x-y axis proof mass 110 in the x-direction as well as y-tethers arranged to allow displacement of the x-y axis proof mass in the y-direction. The separate x and y-tethers may be any suitable spring arranged to provide a restoring force on the x-y axis proof mass. For example, possible x and y-tethers include, but are not limited to, compression springs, tension springs, and box springs. The x-y tethers 112 may be positioned in any suitable position and in any suitable orientation to facilitate displacement of the x-y axis proof mass in a predetermined direction and to provide a restoring force in said predetermined direction. Any suitable number of x-y tethers, or x-tethers and y-tethers may be provided to allow desired motion of the x-y axis proof masses. Thus, the illustration of four x-y tethers in FIG. 1 is non-limiting.

Variations on the z-tethers 126 are also possible. According to the embodiment depicted in FIG. 1, the z-tethers may be arranged as torsional springs that provide a restoring force which returns the z-axis proof mass 120 to a resting position when the z-axis proof mass is rotated out of the x-y plane. The z-tether may be any suitable torsional spring, as the present disclosure is not so limited. While two z-tethers 126 are illustrated in FIG. 1, alternative numbers may be provided. In some embodiments, the x-y tethers and the z-tethers may not be arranged as springs, but rather may be any suitable support that suspends the x-y axis proof mass and the z-axis proof mass above the substrate and allows each of the masses to move.

In some embodiments, the thickness of a tether may impact said tether's sensitivity to undesirable mechanical crosstalk between one or more sensing directions. More specifically, tethers that are sufficiently rigid may prevent unwanted modes. That is, when the tethers are sufficiently rigid, the mechanical crosstalk modes are high enough in frequency that they will not be excited by typical operating conditions. In some embodiments, a tether (e.g., x-y tether and z-tether) may have a suitable material thickness to reduce mechanical crosstalk. For example, a thickness (as measured in the z-direction of FIG. 1) of a tether may be greater than 2 µm, 5 µm, 8 µm, 10 µm, 15 µm, 20 µm, 25 µm, 30 µm, between 2 and 35 µm, or any other suitable thickness. Correspondingly, a thickness of a tether may be less than 35 µm, 28 µm, 23 µm, 18 µm, 13 µm, 9 µm, 7 µm, 4 µm, and/or any other suitable thickness. Combinations of the above-noted ranges are contemplated including, but not limited to, thicknesses between 25 and 35 µm, 10 and 23 µm, as well as between 5 and 13 µm. Of course, any suitable thickness of a tether may be employed, as the present disclosure is not so limited.

In some cases, a thickness of a tether may correspond to a particular width of a tether (as measured in the x-y plane of FIG. 1) so that a tether may have a desirable rigidity to reduce mechanical crosstalk. For example, a ratio between a thickness and width of a tether may be greater than 0.5, 2, 4, 6, 8, 10, 15, 20, and/or any other suitable ratio. Correspondingly, a ratio between a thickness and width of a tether may be less than 25, 20, 15, 10, 8, 6, 4, 1, and/or any other suitable ratio. Combinations of the above-noted ranges are contemplated including, but not limited to, ratios 0.5 and 4, 10 and 25, as well as 6 and 15. Of course, any suitable ratio between a thickness and width of a tether may be employed, as the present disclosure is not so limited.

Figure 2:
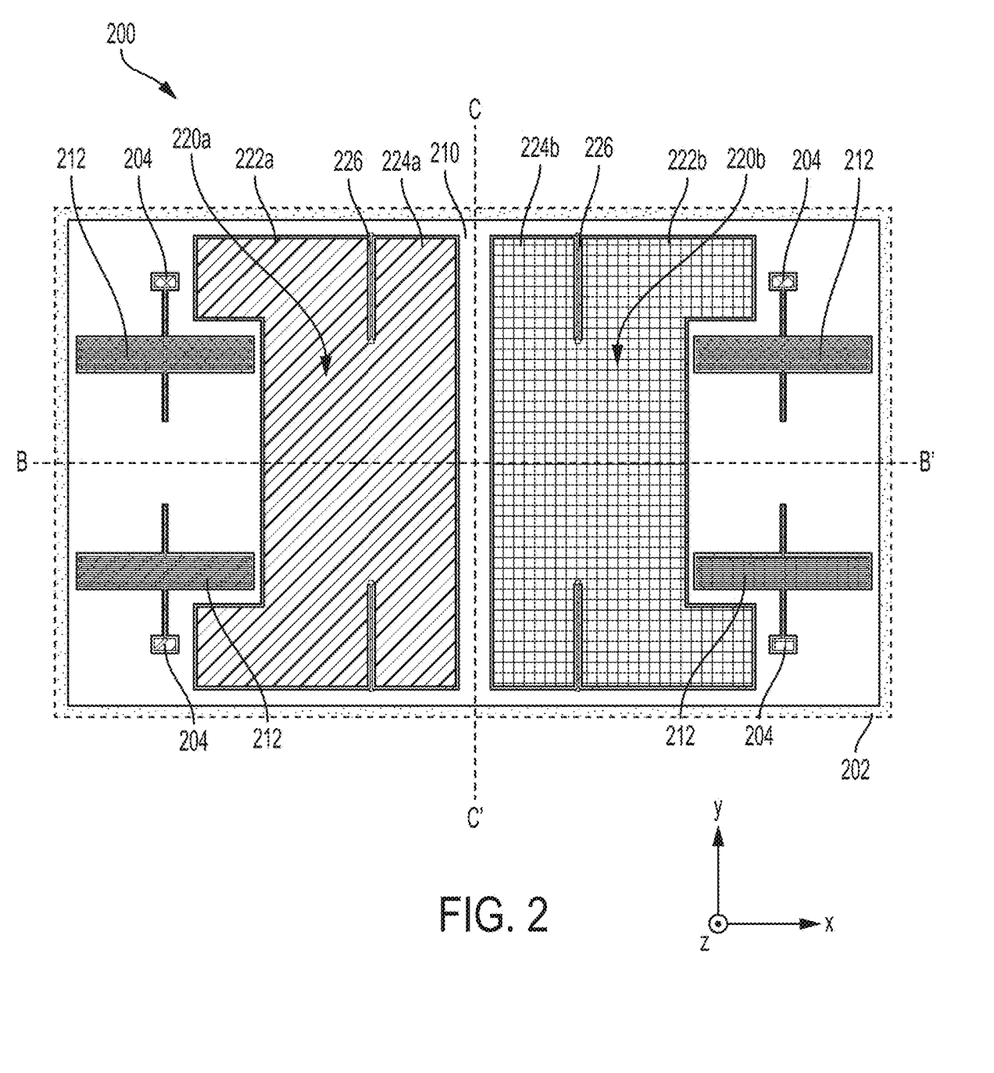
FIG. 2 is a top view of one embodiment of a three-axis accelerometer having two z-axis proof masses embedded within an x-y axis proof mass.

FIG. 2 depicts another embodiment of a three-axis accelerometer 200 capable of differential z-direction acceleration sensing including an x-y axis proof mass 210 and two z-axis proof masses 220a, 220b which each include a first portion 222a, 222b and a second portion 224a, 224b. The accelerometer also includes a substrate 202, anchors 204, x-y tethers 212, and z-tethers 226. As with the substrate 102 in the non-limiting embodiment of FIG. 1, the substrate 202 functions as a base for the accelerometer and is directly connected to the anchors 204. The substrate also functions as a stationary platform which may include driver or sensing elements which may move and/or measure movement of the x-y mass and z-axis proof mass. The anchors 204 are arranged to connect to the x-y tethers 212 and suspend the x-y axis proof mass (and indirectly the z-axis proof mass) above the substrate 202. The x-y axis proof mass is arranged to move in lateral directions (x and y-directions), which movement is measured and used to calculate acceleration in at least one of the x and y-directions. The x-y tethers 212 are arranged to couple the x-y axis proof mass to the anchors 204 and provide a restoring force to the x-y axis proof mass. In particular the x-y tethers are arranged as a box spring which compresses in a first direction (e.g., the y-direction) and rotates in a second in-plane direction (e.g., the x-direction). The embodiment of FIG. 2 differs from that of FIG. 1 in that the x-y tethers are oriented differently in the two embodiments, as shown. The z-axis proof masses 220a, 220b are arranged as teeter-totter masses with first portions 222a, 222b and second portions 224a, 224b. Accordingly, the z-axis proof masses are arranged to rotate into or out of the x-y plane, and thus move in the z-direction. The first portions 222a, 222b have a larger mass than the second portions 224a, 224b. Those mass imbalances cause rotation of the z-axis proof masses in response to an applied z-direction acceleration. The z-tethers 226 are arranged as torsional springs which resist the rotation of the x-y axis proof mass and restore the z-axis proof masses to a resting position. The z-tethers couple the z-axis proof mass to the x-y axis proof mass.

As shown in FIG. 2, the two z-axis proof masses 220a, 220b are embedded within the x-y axis proof mass 210. The two z-axis proof masses are oriented oppositely relative to the y-axis of the accelerometer 200. That is, the first portions 222a, 222b are equidistant from the y-axis and the second portions 224a, 224b are similarly equidistant from the y-axis. According to the embodiment of FIG. 2, the two z-axis proof masses are also symmetrically arranged about the x-axis of the accelerometer. Accordingly, the two z-axis proof masses exhibit total in-plane symmetry with equal mass distribution about both of the x and y-axes. That is, the two z-axis proof masses are symmetrical with equal mass distribution on either side of longitudinal centerline B-B' and transverse centerline C-C'. Such an arrangement may reduce mechanical cross-talk and improve accuracy of the accelerometer. According to the embodiment of FIG. 2, the outputs of the two z-axis proof masses 220a, 220b may be combined to create a single output signal indicative of acceleration in the z-direction. For example, the difference of the two z-axis proof mass outputs may be taken (i.e., differential detection) to reduce noise and offset error associated with a single z-axis proof mass signal. Such an arrangement may improve accuracy relative to an accelerometer with a single z-axis proof mass. Of course, any suitable combination or processing of the two z-axis proof mass signals may be employed, as the present disclosure is not so limited.

According to the embodiment of FIG. 2, the x-y axis proof mass 210 surrounds the two z-axis proof masses 220a, 220b and has total in-plane symmetry. That is, the x-y axis proof mass has equal mass distribution relative to the longitudinal centerline B-B' and transverse centerline C-C'. Accordingly, the accelerometer 200 may be less susceptible to mechanical crosstalk. As shown in FIG. 2, the x-y axis proof mass is coupled to the substrate 202 by x-y tethers 212 arranged as box springs which are coupled to the anchors 204 fixed to the substrate. The x-y tethers and anchors are symmetrically positioned about both the x and y-axes so that the accelerometer has total in-plane symmetry.

Figure 3:
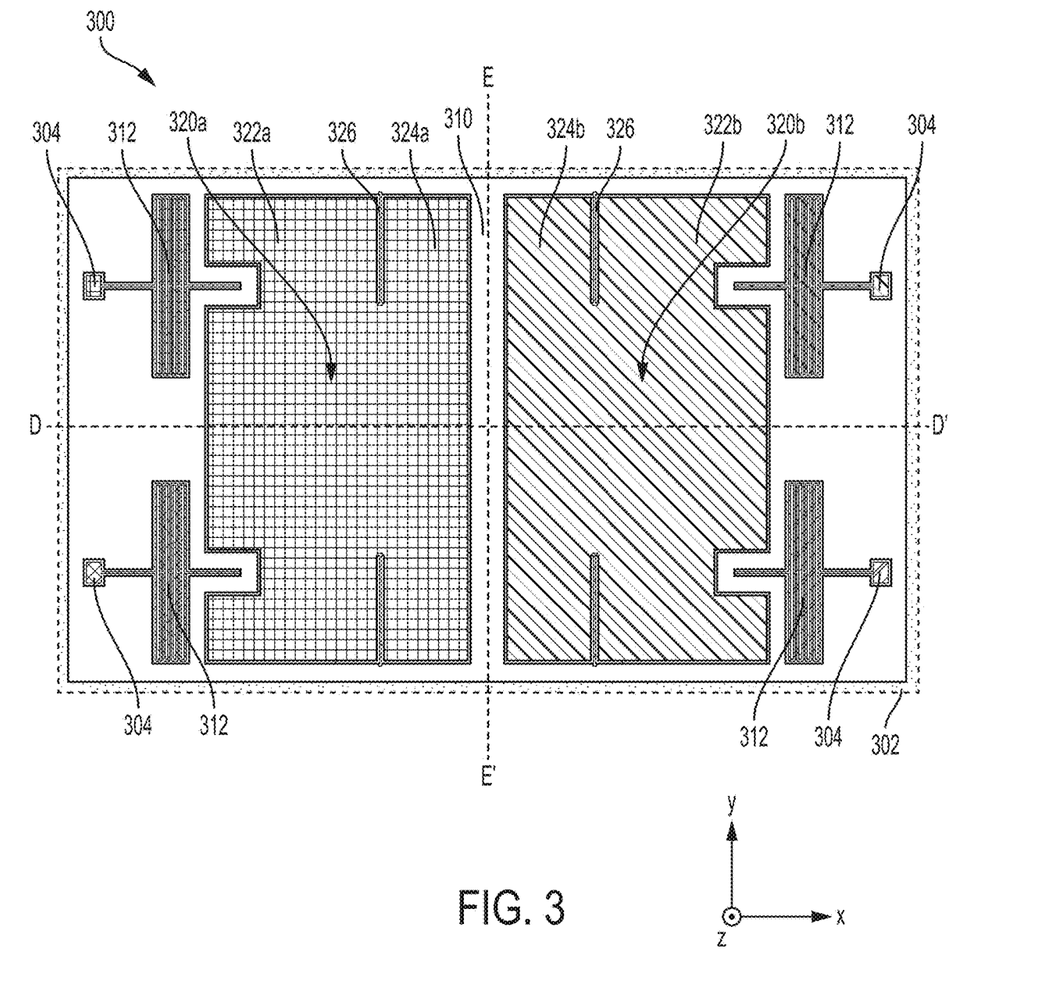
FIG. 3 is a top view of an alternative embodiment to that of FIG. 2, representing a three-axis accelerometer having two z-axis proof masses embedded within an x-y axis proof mass.

FIG. 3 depicts an alternative embodiment to that of FIG. 2, representing a three-axis accelerometer 300 including an x-y axis proof mass 310 and two z-axis proof masses 320a, 320b each of which includes a first portion 322a, 322b and a second portion 324a, 324b. The accelerometer 300 also includes a substrate 302, anchors 304, x-y tethers 312, and z-tethers 326. As with the substrate 102 in the non-limiting embodiment of FIG. 1, the substrate 302 functions as a base for the accelerometer and is directly connected to the anchors 304. The substrate also functions as a stationary platform which may include driver or sensing elements which may move and/or measure movement of the x-y axis proof mass and z-axis proof mass. The anchors 304 are arranged to connect to the x-y tethers 312 and suspend the x-y axis proof mass (and indirectly the z-axis proof mass) above the substrate 302. The x-y axis proof mass is arranged to move in lateral directions (x and y-directions), which movement is measured and used to calculate acceleration in at least one of the x and y-directions. The x-y tethers 312 are arranged to couple the x-y axis proof mass to the anchors 304 and provide a restoring force to the x-y axis proof mass. In particular the x-y tethers are arranged as a box spring which compresses in a first direction (e.g., the x-direction) and rotates in a second in-plane direction (e.g., the y-direction). The embodiment of FIG. 3 differs from that of FIG. 2 in that the x-y tethers are oriented differently in the two embodiments, as shown. The z-axis proof masses 320a, 320b are arranged as teeter-totter masses with first portions 322a, 322b and second portions 324a, 324b. Accordingly, the z-axis proof masses are arranged to rotate into or out of the x-y plane, and thus move in the z-direction. The first portions 322a, 322b have a larger mass than the second portions 324a, 324b. Those mass imbalances cause rotation of the z-axis proof masses in response to an applied z-direction acceleration. The z-tethers 326 are arranged as torsional springs which resist the rotation of the x-y axis proof mass and restore the z-axis proof masses to a resting position. The z-tethers couple the z-axis proof mass to the x-y axis proof mass.

As shown in FIG. 3, the two z-axis proof masses 320a, 320b are embedded within the x-y axis proof mass 310 in a similar manner to that of FIG. 2. The two z-axis proof masses are oriented oppositely relative to the y-axis of the accelerometer 300. That is, the first portions 322a, 322b are equidistant from the y-axis and the second portions 324a, 324b are similarly equidistant from the y-axis. According to the embodiment of FIG. 2, the two z-axis proof masses are also symmetrically arranged about the x-axis of the accelerometer. Accordingly, the two z-axis proof masses exhibit total in-plane symmetry with equal mass distribution on either side of longitudinal centerline D-D' and transverse centerline E-E'. According to the embodiment of FIG. 3 and similar to the embodiment of FIG. 2, the outputs of the two z-axis proof masses 320a, 320b may be combined to create a single output signal indicative of acceleration in the z-direction.

According to the embodiment of FIG. 3, the x-y axis proof mass 310 surrounds the two z-axis proof masses 320a, 320b and has total in-plane symmetry similar to the embodiment of FIG. 2. That is, the x-y axis proof mass has equal mass distribution relative to the longitudinal centerline D-D' and transverse centerline E-E'. Accordingly, the accelerometer 300 may be less susceptible to mechanical crosstalk. As shown in FIG. 3, the x-y axis proof mass is coupled to the substrate 302 by x-y tethers 312 arranged as box springs which are coupled to the anchors 304 fixed to the substrate. The x-y tethers and anchors are symmetrically positioned about both the x and y-axes so that the accelerometer has total in-plane symmetry. In contrast to the embodiment of FIG. 2, the x-y tethers 312 and anchors 304 are oriented perpendicularly relative to the x-y tethers 212 of FIG. 2.

Accordingly, the anchors are disposed further from the center of the accelerometer and the two z-axis proof masses may occupy a larger relative area of the x-y axis proof mass and have more mass as a result. A z-axis proof mass with a larger mass may be able to utilize thicker tethers which may reduce mechanical cross-talk by lessening the effect of undesirable modes as discussed previously.

Figure 4:
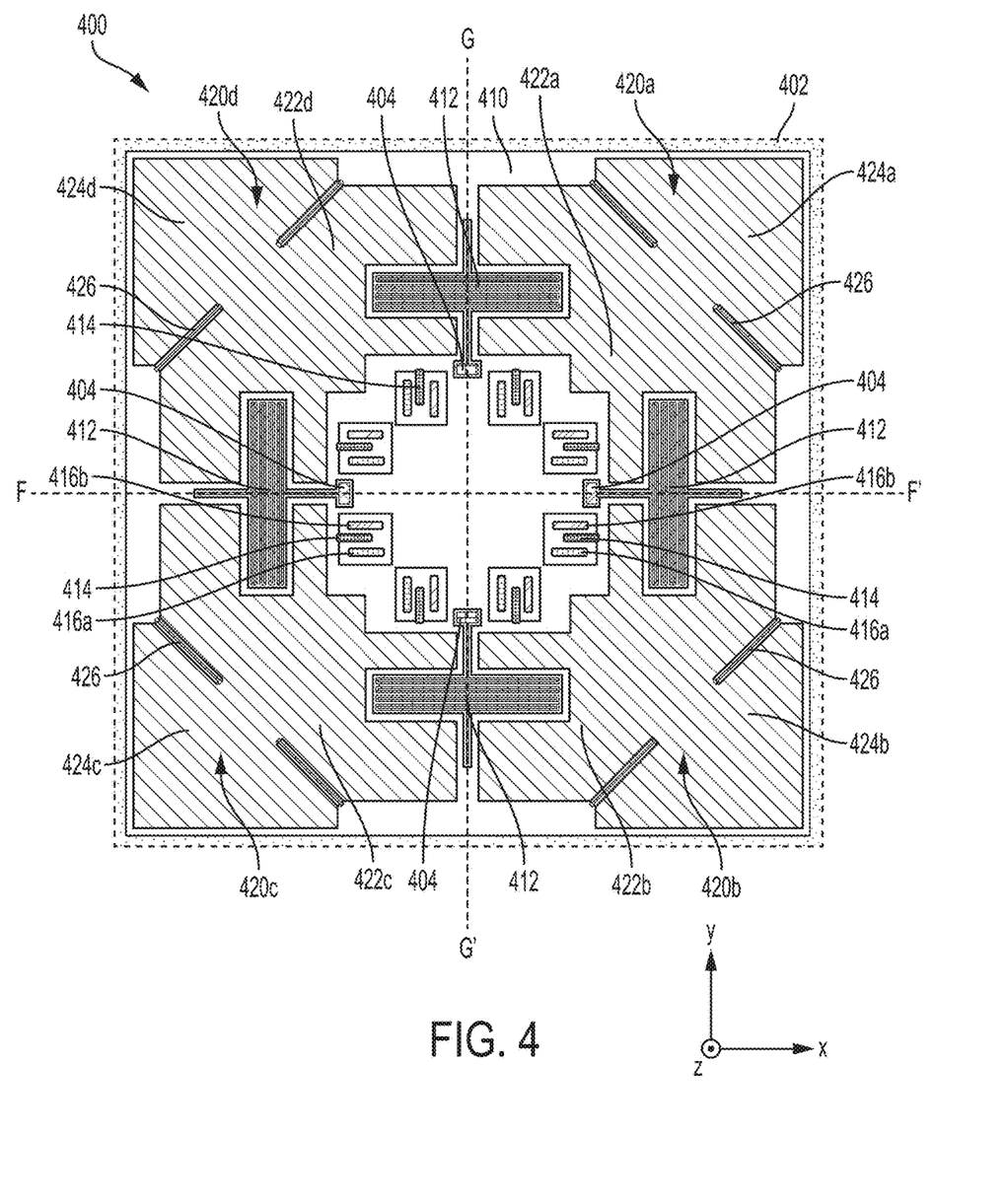
FIG. 4 is a top view of one embodiment of a three-axis accelerometer having four z-axis proof masses embedded within an x-y axis proof mass.

FIG. 4 depicts another embodiment of a three-axis accelerometer 400 exhibiting total in-plane symmetry including an x-y axis proof mass 410 and four z-axis proof masses 420a, 420b, 420c, 420d each including a first portion 422a, 422b, 422c, 422d, as well as a second portion 424a, 424b, 424c, 424d. The accelerometer also includes a substrate 402, anchors 404, x-y tethers 412, z-tethers 426, fingers 414, positive electrodes 416a, and negative electrodes 416b. The x-y axis proof mass 410 is arranged to translate in lateral directions (x and y-directions). Each of the z-axis proof masses 420a, 420b, 420c, 420d is arranged to rotate out of plane in relation to the x-y axis proof mass. Each of the first portions 422a, 422b, 422c, 422d has more mass than each of the second portions 424a, 424b, 424c, 424d, and as a result the z-axis proof masses will rotate when subjected to accelerations in the z-direction.

As shown in FIG. 4, the anchors 404 are fixed to the substrate 402, and are arranged to be connected to the x-y tethers 412. The x-y tethers are arranged as box springs and suspend the x-y axis proof mass above the substrate and allow for the x-y axis proof mass 410 to move in the x and y-directions while providing a restoring force to return the x-y axis proof mass to a resting position. The z-tethers 426 are arranged as torsional springs which suspend the z-axis proof mass above the substrate and mechanically couple the x-y axis proof mass to the z-axis proof masses 420a, 420b, 420c, 420d. The z-tethers also provide a restoring force which returns each of the z-axis proof masses to a resting position when the z-axis proof masses are rotated out of the x-y plane. The fingers 414 are coupled to, or in some embodiments represent part of, the x-y axis proof mass and move with the x-y axis proof mass when the x-y axis proof mass moves. The fingers are disposed between positive electrodes 416a and negative electrodes 416b, which are fixed to the substrate 402 and which may be used to measure the distance between the fingers 414 and the electrodes. For example, the electrodes may be used to measure a capacitance between the fingers and the electrodes which may correspond to a particular position of the x-y axis proof mass. The electrodes 416a, 416b may also be used to drive the x-y axis proof mass at a particular frequency and measure changes in said frequency to detect acceleration. Of course, the electrodes and fingers may be used for any suitable function to measure accelerations, as the present disclosure is not so limited.

According to the embodiment of FIG. 4, each of the four z-axis proof masses 420a, 420b, 420c, 420d may have corresponding electrodes (e.g., first and second electrodes, sometimes referred to as positive and negative electrodes) disposed on the substrate. The positive electrodes may be positioned near the first portions 422a, 422b, 422c, 422d of the z-axis proof mass and the negative electrodes may be positioned near the second portions 424a, 424b, 424c, 424d or vice versa. The electrodes may detect the capacitances formed by the substrate and the z-axis proof masses. In some embodiments, the positive and negative electrode may be used to drive the z-axis proof masses at a predetermined frequency and measure the change in frequency in response to an applied acceleration. In some embodiments, the signals from each of the z-axis proof masses may be combined as a differential signal or some other combination to improve the accuracy of the accelerometer. For example, in the case of in-plane rotation, each of the z-axis proof masses on opposing sides would move in opposite directions in response to the rotation which may be canceled out by using differential signaling between the separate z-axis proof masses. According to this example, common mode signals or noise would be canceled by the use of differential signal combination.

As shown in FIG. 4, the accelerometer 400 is square in shape. That is, the substrate 402 is square and all of the components are disposed on the substrate and fit within the bounds of the substrate. Such an arrangement may further promote the reduction of noise and mechanical cross-talk between the x, y, and z-directions. According to the embodiment of FIG. 4, each of the components is symmetrically oriented about each of the x and y-axes so that the accelerometer has total in-plane symmetry. That is, the components are symmetrical with equal mass distribution on either side of longitudinal centerline F-F' and transverse centerline G-G'. In this case, the accelerometer also has symmetry as a square which may further reduce susceptibility to mechanical crosstalk. For example, as discussed previously, the z-axis proof masses may cancel common mode noise as each of the masses may respond oppositely on opposing sides or corners of the accelerometer to a disturbance such as in-plane rotation.

According to the embodiment shown in FIG. 4, the z-axis proof masses 420a, 420b, 420c, 420d may be arranged so that the anchors 404 may be disposed close to the center. Anchors closer to the center of the substrate may be less prone to offset error which may be caused by thermal or mechanical stress on the substrate. That is, if the substrate undergoes any warping, the center is less likely to warp significantly than the edges of the substrate. Accordingly, with the anchors disposed inside of the z-axis proof masses with respect to the center, offset error may be reduced or eliminated.

Figure 5:
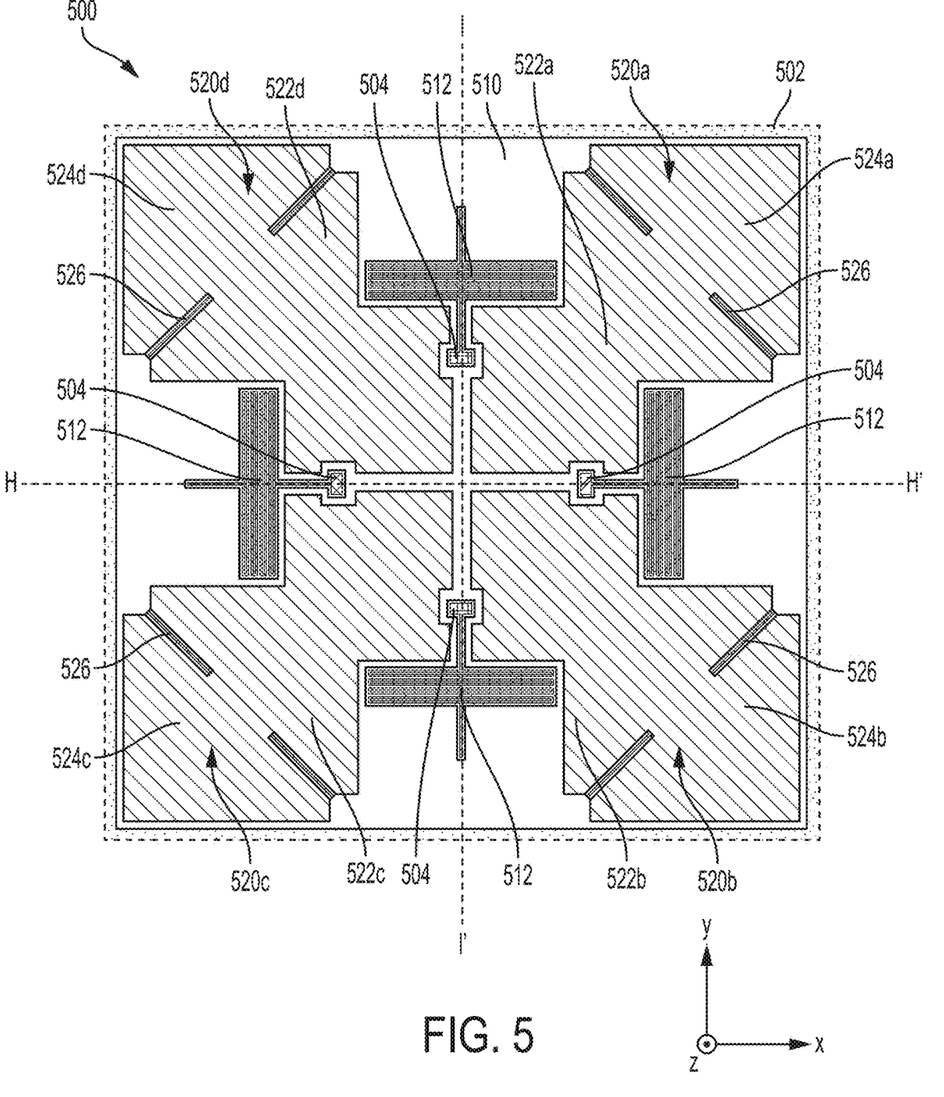
FIG. 5 is a top view of an alternative embodiment to that of FIG. 4, representing a three-axis accelerometer having four z-axis proof masses embedded within an x-y axis proof mass.

FIG. 5 depicts an alternative embodiment to that of FIG. 4, representing a three-axis accelerometer 500 including an x-y axis proof mass 410 and four z-axis proof masses 520a, 520b, 520c, 520d each including a first portion 522a, 522b, 522c, 522d, as well as a second portion 524a, 524b, 524c, 524d. The accelerometer also includes a substrate 502, anchors 504, x-y tethers 512, and z-tethers 526. The x-y axis proof mass 510 is arranged to translate in lateral directions (x and y-directions). Each of the z-axis proof masses 520a, 520b, 520c, 520d is arranged to rotate out of plane in relation to the x-y axis proof mass. Each of the first portions 522a, 522b, 522c, 522d has more mass than each of the second portions 524a, 524b, 524c, 524d, and as a result the z-axis proof masses will rotate when subjected to accelerations in the z-direction. The anchors 504 are fixed to the substrate 502, and are arranged to be connected to the x-y tethers 512. The x-y tethers are arranged as box springs and suspend the x-y axis proof mass above the substrate and allow for the x-y axis proof mass 510 to move in the x and y-directions while providing a restoring force to return the x-y axis proof mass to a resting position. The z-tethers 526 are arranged as torsional springs which suspend the z-axis proof mass above the substrate and mechanically couple the x-y axis proof mass to the z-axis proof masses 520a, 520b, 520c, 520d and also provide a restoring force which returns the z-axis proof mass to a resting position when it is rotated out of the x-y plane.

According to the embodiment shown in FIG. 5, the accelerometer 500 may include fingers disposed near the outer edges of the x-y axis proof mass 510 and coupled to the x-y axis proof mass to move with the x-y axis proof mass. Positive electrodes and negative electrodes may be used to measure the position and/or frequency of the x-y axis proof mass fingers and the electrodes. Similarly, the accelerometer may include electrodes disposed on the substrate beneath the z-axis proof masses 520a, 520b, 520c, 520d to detect the position and/or frequency of the z-axis proof masses.

As shown in FIG. 5, the accelerometer 500 is square and has total in-plane symmetry. That is, the components are symmetrical with equal mass distribution on either side of longitudinal centerline H-H' and transverse centerline I-I'. Accordingly, the accelerometer may reject common mode noise in response to certain accelerations (e.g., in-plane rotation) and be subject to reduced mechanical crosstalk which may improve accuracy of the accelerometer as discussed previously.

According to the embodiment of FIG. 5, the z-axis proof masses may have greater—and in some cases significantly greater—mass nearer the center of the accelerometer than toward the periphery. For example, as described previously, first portions 522a, 522b, 522c, 522d may have more mass than each of the second portions 524a, 524b, 524c, 524d. Such a configuration may facilitate using thicker springs with the z-axis proof masses 520a, 520b, 520c, 520d, the use of which may further reduce mechanical crosstalk.

Figure 6:
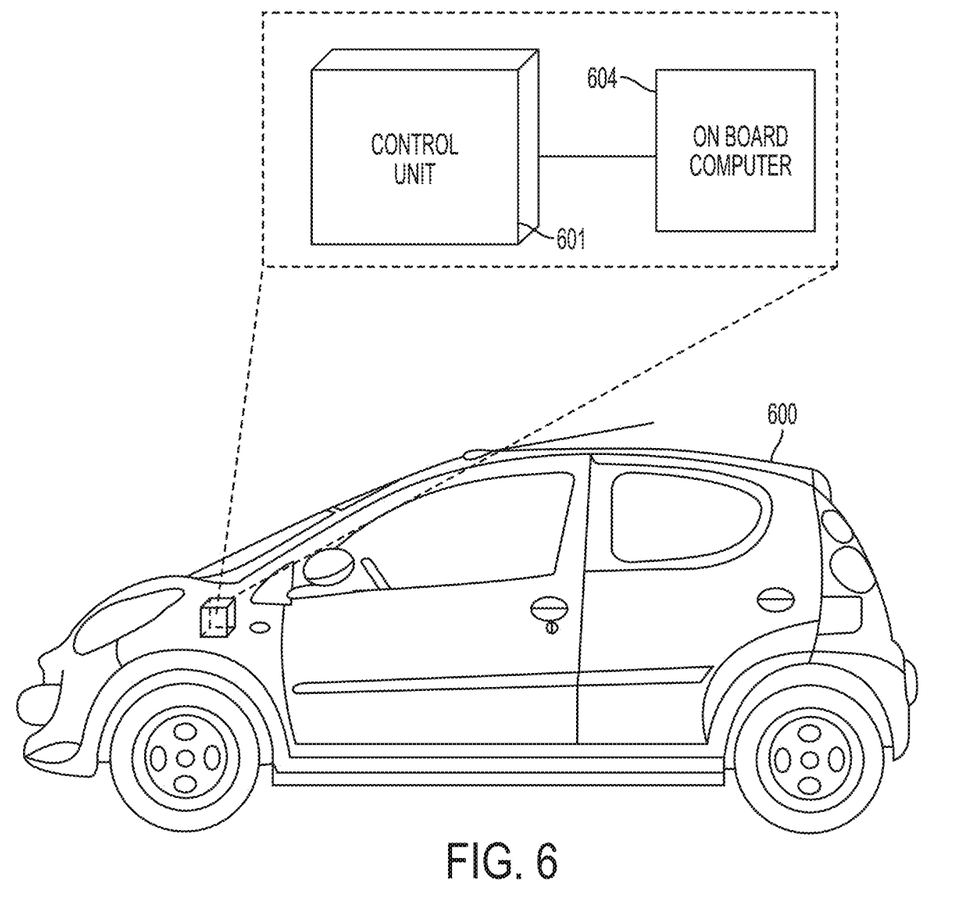
FIG. 6 illustrates an automobile which may include at least one three-axis accelerometer according to a non-limiting embodiment of the present application.

Some applications of some embodiments of the present application include low or high acceleration environments including, but not limited to, automotive, wearables, and machine health monitoring. FIG. 6 illustrates a non-limiting example in which a three-axis accelerometer of the types described herein is employed in a car. In the example of FIG. 6, an automobile 600 includes a control unit 601 coupled to an onboard computer 604 of the car by a wired or wireless connection. Control unit 601 may include at least one three-axis accelerometer of the types described herein. As a non-limiting example, the at least one three-axis accelerometer may sense accelerations in the driving direction and/or perpendicular to the driving direction. The at least one three-axis accelerometer may also be configured to sense vertical accelerations, which may be useful to monitor the status of a suspension of the automobile 600, for example. The control unit 601 may receive power and control signals from the onboard computer 604, and may supply output signals of the type described herein to the onboard computer 604.

Reduced mechanical crosstalk in a single mass accelerometer may be achieved in a package much smaller than conventional offerings which may be desirable in certain applications. In some embodiments, an accelerometer may have a die area greater than 0.5 mm$^2$, 0.75 mm$^2$, 1 mm$^2$, 1.25 mm$^2$, 1.5 mm$^2$, 1.75 mm$^2$, 2 mm$^2$, 2.5 mm$^2$, 3 mm$^2$, and or any other suitable area. Correspondingly, an accelerometer may be less than 3.5 mm$^2$, 2.75 mm$^2$, 2.25 mm$^2$, 2 mm$^2$. 1.75 mm$^2$, 1.5 mm$^2$, 1.25 mm$^2$, 1 mm$^2$, 0.75 mm$^2$, and/or any other suitable area. Combinations of the above-noted ranges are contemplated, including, but not limited to, 0.5 and 1.75 mm$^2$, 1 and 2.25 mm$^2$, as well as 1.5 and 3.5 mm$^2$. Of course, any suitable die area may be employed, as the present disclosure is not so limited.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A single mass integrated three-axis accelerometer, comprising:
    a substrate;
    a single mass comprising:
        a single x-y acceleration detection portion; and
        four teeter-totter z-axis acceleration detection portions embedded within the x-y acceleration detection portion, wherein the four teeter-totter z-axis acceleration detection portions are configured to rotate independently from one another;
    a plurality of electrodes disposed on the substrate underlying the four teeter-totter z-axis acceleration detection portions configured to sense differential displacement of each of the four teeter-totter z-axis acceleration detection portions;
    four anchors disposed on the substrate, wherein each of the four anchors is disposed radially inward of the four teeter-totter z-axis acceleration detection portions relative to a center of the substrate;
    four two-axis box tethers, wherein each of the four two-axis box tethers couples the x-y acceleration detection portion to one of the four anchors; and
    four teeter-totter tethers, wherein each of the four teeter-totter tethers couples one of the four teeter-totter z-axis acceleration detection portions to the x-y acceleration detection portion.

2. The single mass integrated three-axis accelerometer of claim 1, wherein the accelerometer is symmetrical about at least one of an x-axis and a y-axis of the accelerometer.

3. A single mass integrated three-axis accelerometer, comprising:
    a substrate;
    four anchors coupled to the substrate;
    a single combined x-y acceleration detection proof mass, wherein the combined x-y acceleration detection proof mass is coupled to the four anchors by four first tethers;
    first, second, third, and fourth teeter-totter z-axis acceleration detection proof masses embedded within the combined x-y acceleration detection proof mass, wherein the first, second, third, and fourth teeter-totter z-axis acceleration detection proof masses are coupled to the combined x-y acceleration detection proof mass by a second tether, a third tether, a fourth tether, and a fifth tether respectively, and wherein the first, second, third, and fourth teeter-totter z-axis acceleration detection proof masses are configured to rotate independently from one another, wherein each of the four anchors is disposed radially inward of the first, second, third, and fourth teeter-totter z-axis acceleration detection proof masses relative to a center of the substrate;
    a plurality of electrodes disposed on the substrate underlying the first, second, third, and fourth teeter-totter z-axis acceleration detection proof masses configured to sense differential displacement of each of the first, second, third, and fourth teeter-totter z-axis acceleration detection proof masses.

4. The single mass integrated three-axis accelerometer of claim 3, wherein the accelerometer is symmetrical about at least one of an x-axis and a y-axis of the accelerometer.

5. The single mass integrated three-axis accelerometer of claim 4, wherein the accelerometer is symmetrical about both of the x-axis and the y-axis of the accelerometer.

6. A single mass integrated three-axis accelerometer, comprising:
- a substrate;
- a single mass including:
  - a single x-y acceleration detection portion; and
  - four teeter-totter z-axis acceleration detection portions embedded within the x-y acceleration detection portion, wherein the accelerometer is symmetrical about both an x-axis and a y-axis of the accelerometer and exhibits rotational symmetry within an x-y plane, wherein the accelerometer is square, and wherein each of the four teeter-totter z-axis acceleration detection portions is entirely disposed in a respective quadrant of the accelerometer as defined by the x-axis and y-axis of the accelerometer;
- a plurality of electrodes disposed on the substrate underlying the four teeter-totter z-axis acceleration detection portions configured to sense differential displacement of each of the four teeter-totter z-axis acceleration detection portions;
- four anchors disposed on the substrate, wherein each of the four anchors is disposed radially inward of the four teeter-totter z-axis acceleration detection portions relative to a center of the substrate;
- four two-axis box tethers, wherein each of the four two-axis box tethers couples the x-y acceleration detection portion to one of the four anchors; and
- four teeter-totter tethers, wherein each of the four teeter-totter tethers couples one of the four teeter-totter z-axis acceleration detection portions to the x-y acceleration detection portion.

7. The single mass integrated three-axis accelerometer of claim 2, wherein the accelerometer is symmetrical about both of the x-axis and the y-axis of the accelerometer.

8. The single mass integrated three-axis accelerometer of claim 6, wherein the four teeter-totter z-axis acceleration detection portions are configured to rotate independently from one another.

9. The single mass integrated three-axis accelerometer of claim 1, wherein the plurality of electrodes includes a first electrode configured to sense displacement of a first portion of a first teeter-totter z-axis acceleration detection portion of the four teeter-totter z-axis acceleration detection portions, and wherein the plurality of electrodes includes a second electrode configured to sense displacement of a second portion of the first teeter-totter z-axis acceleration detection portion.

10. The single mass integrated three-axis accelerometer of claim 3, wherein the plurality of electrodes includes a first electrode configured to sense displacement of a first portion of the first teeter-totter z-axis acceleration detection proof mass, and wherein the plurality of electrodes includes a second electrode configured to sense displacement of a second portion of the first teeter-totter z-axis acceleration detection proof mass.

11. The single mass integrated three-axis accelerometer of claim 6, wherein the plurality of electrodes includes a first electrode configured to sense displacement of a first portion of a first teeter-totter z-axis acceleration detection portion of the four teeter-totter z-axis acceleration detection portions, and wherein the plurality of electrodes includes a second electrode configured to sense displacement of a second portion of the first teeter-totter z-axis acceleration detection portion.

* * * * *